Jan. 21, 1941.  E. L. TORNQUIST  2,229,531
DISTRIBUTION SYSTEM
Filed Feb. 2, 1938  9 Sheets-Sheet 7

Fig. 7.

Inventor:
Earl L. Tornquist.

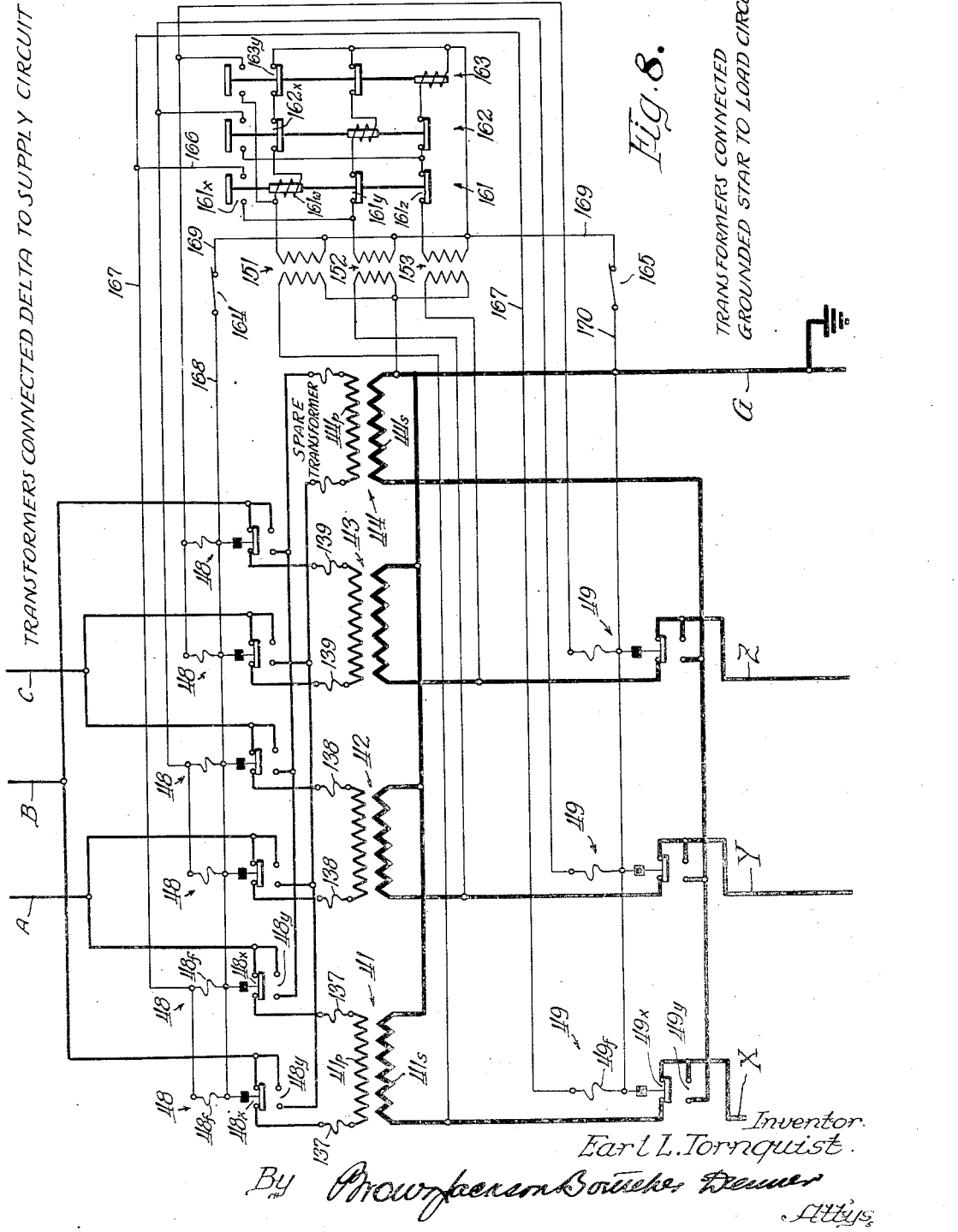

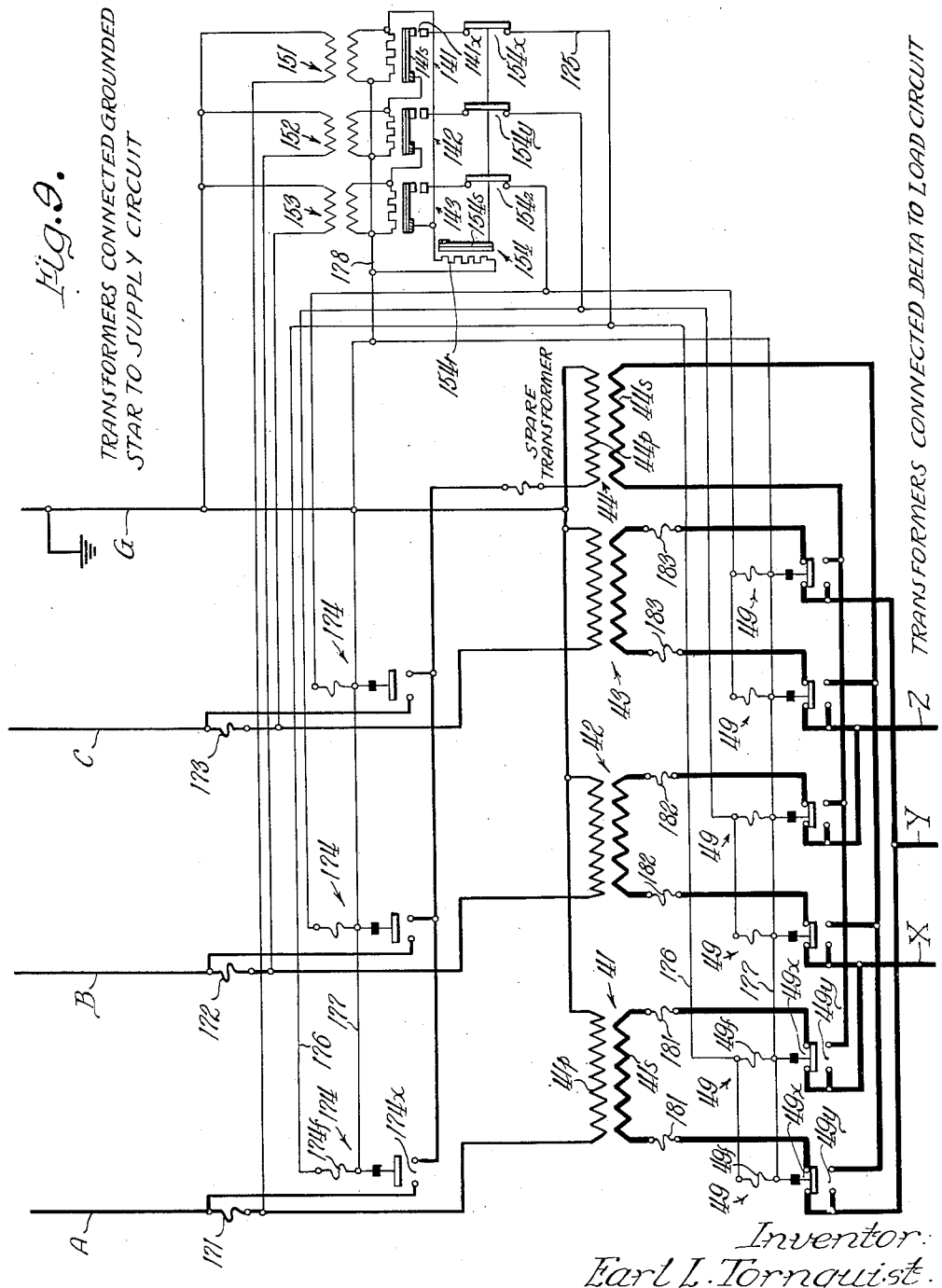

Patented Jan. 21, 1941

2,229,531

UNITED STATES PATENT OFFICE 2,229,531

DISTRIBUTION SYSTEM

Earl L. Tornquist, Elmhurst, Ill.

Application February 2, 1938, Serial No. 188,311

31 Claims. (Cl. 171—97)

My invention relates, generally, to electric power distribution systems and it has particular relation to systems adapted to maintain continuity of flow of electric energy between a supply circuit and a load circuit on the occurrence of a fault.

It is now general practice in alternating current distribution systems to employ one or more transformers between a high voltage supply circuit and a low voltage load circuit to step down the voltage of the supply circuit and make it available for low voltage distribution. For example, the supply circuit may operate at a voltage of 2,300 volts while the low voltage circuit may operate at a voltage of 110 volts. Of course, other voltage combinations are also employed. It is highly desirable and often essential to maintain continuity of flow of electric energy between the supply circuit and the load circuit. It is sometimes the case that a fault occurs in one of the transformers, thereby requiring that it be disconnected from the circuits. This usually results in the deenergization of the load circuit until such time that the faulty transformer is replaced or repaired.

The fault occurring in a transformer may result from various causes. If the transformer is operated under overload conditions for a long period, its temperature may rise to such a point that the insulation of the windings is broken down. One or more short circuits may occur between the various turns of the windings, thereby causing short circuit currents to flow. The insulation of one of the windings may be punctured by voltage surges, such as are caused by lightning strokes or switching surges with the result that the turns of the winding are short-cuited or are grounded. An exceptionally heavy flow of current usually follows the occurrence of these faults with the result that the transformer may be destroyed if it is not immediately disconnected from the circuits.

When a single phase transformer is employed to interconnect single phase supply and load circuits, it is customary to provide a circuit interrupter in the form of a fuse between the primary winding and the supply circuit. On the occurrence of a fault in the transformer or beyond it in the load circuit, this fuse blows and interrupts the flow of current to the transformer. If the fault no longer persists, service may be restored by replacing the blown fuse. If the fault occurred in the transformer, it should be replaced or repaired before the circuit is re-fused.

In some installations repeating fuse mechanisms are employed to repeatedly reconnect the transformer to the supply circuit on the repeated occurrence of a fault. There may be two or more reconnections, depending upon the apparatus employed. It is customary to employ three fuses that are arranged to be successively interconnected in the circuit on the successive recurrence of the fault. When the last fuse has been blown, the transformer is disconnected from the supply circuit, and it is necessary for a lineman to replace the fuses and possibly the transformer before service can be restored.

A polyphase transformer bank is employed to interconnect a polyphase supply circuit with a polyphase load circuit. For example, if the supply and load circuits are three phase circuits, a bank of three transformers may be employed to interconnect them. Various connections may be employed as desired. For example, the primary windings of the transformers may be connected delta to the supply circuit and star to the load circuit. The reverse combination of connections may also be employed. Likewise the transformers may be connected delta to both the supply and load circuits. By the same token they may be connected star to both circuits. When the star connections are employed, it is customary to ground the neutral point of the phase windings.

When any one of the transformers of a bank of transformers is subjected to fault conditions, it is customary to disconnect it from the circuits. This requires that the entire bank be disconnected with the result that service on the load circuit is not maintained. Another transformer may be substituted for the faulty transformer and service restored. However, this requires considerable time in order to shift the connections and to substitute a spare transformer for the faulty one. Sometimes it takes several hours in order to effect this substitution during which the load circuit remains deenergized.

The object of my invention, generally stated, is to provide an improved electric power system which shall be simple and efficient in operation and which may be readily and economically installed.

The principal object of my invention is to automatically substitute for one transformer interconnecting supply and load circuits another transformer on the occurrence of a fault in the one transformer.

Another object of my invention is to automatically reconnect a transformer between a supply and load circuit a predetermined number of times on the repeated occurrence of a fault therein and then to interconnect another transformer between these circuits after the last disconnection of the one transformer.

A further object of my invention is to automatically disconnect a transformer from its supply and load circuits on the occurrence of a fault therein and to automatically interconnect another transformer between these circuits.

Still another object of my invention is to automatically substitute a spare transformer for any one of the transformers of a bank on the occurrence of a fault in the one transformer.

Another object of my invention is to automatically reconnect one transformer of a bank of transformers between a supply and load circuit for a predetermined number of times and then to substitute another transformer for the one transformer after the last disconnection thereof.

A still further object of my invention is to prevent the shifting of the connections of the spare transformer once it has been substituted for one of the transformers of the bank.

A further object of my invention is to employ a minimum number of switches on the high voltage side of a transformer bank for interconnecting the spare transformer between the supply and load circuits in place of a faulty transformer in the bank.

Another object of my invention is to obtain energy from the remaining phases after one transformer of a bank of transformers has failed in order to disconnect the one transformer from the supply and load circuits and to interconnect a spare transformer therebetween.

Other objects of my invention will, in part, be obvious and, in part, appear hereinafter.

My invention, accordingly, is disclosed in the embodiments thereof shown in the accompanying drawings, and it comprises the features of construction, combination of elements, and arrangement of parts which will be exemplified in the constructions hereinafter set forth, and the scope of the application of which will be indicated in the appended claims.

For a more complete understanding of the nature and scope of my invention, reference may be had to the following detailed description taken in connection with the accompanying drawings, in which.

Figure 3:
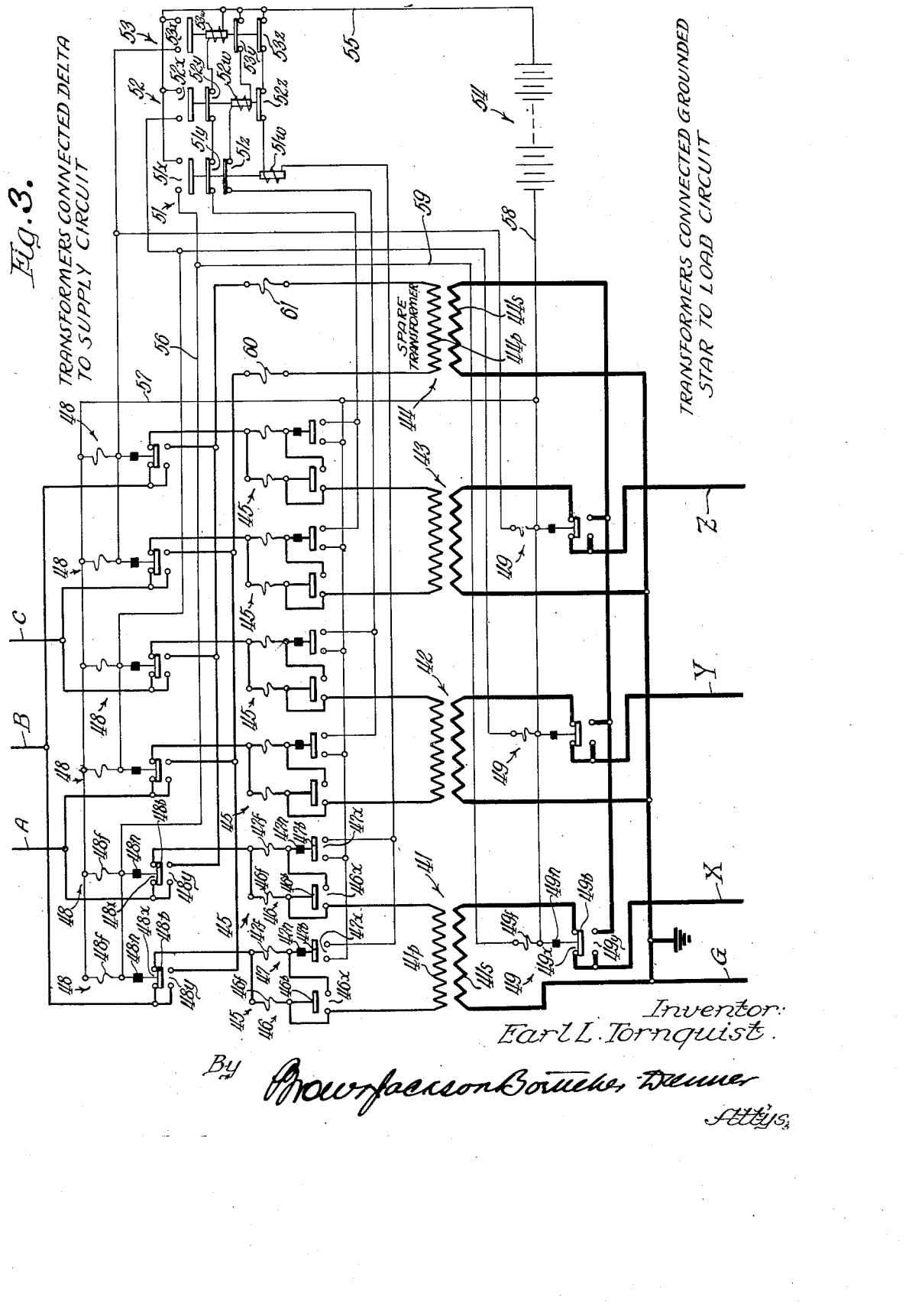
Figure 3 illustrates, diagrammatically, the circuits that may be employed for substituting a spare transformer for any one of the transformers of a transformer bank, the transformers being connected delta to the supply circuit and grounded star to the load circuit.
Figure 4:
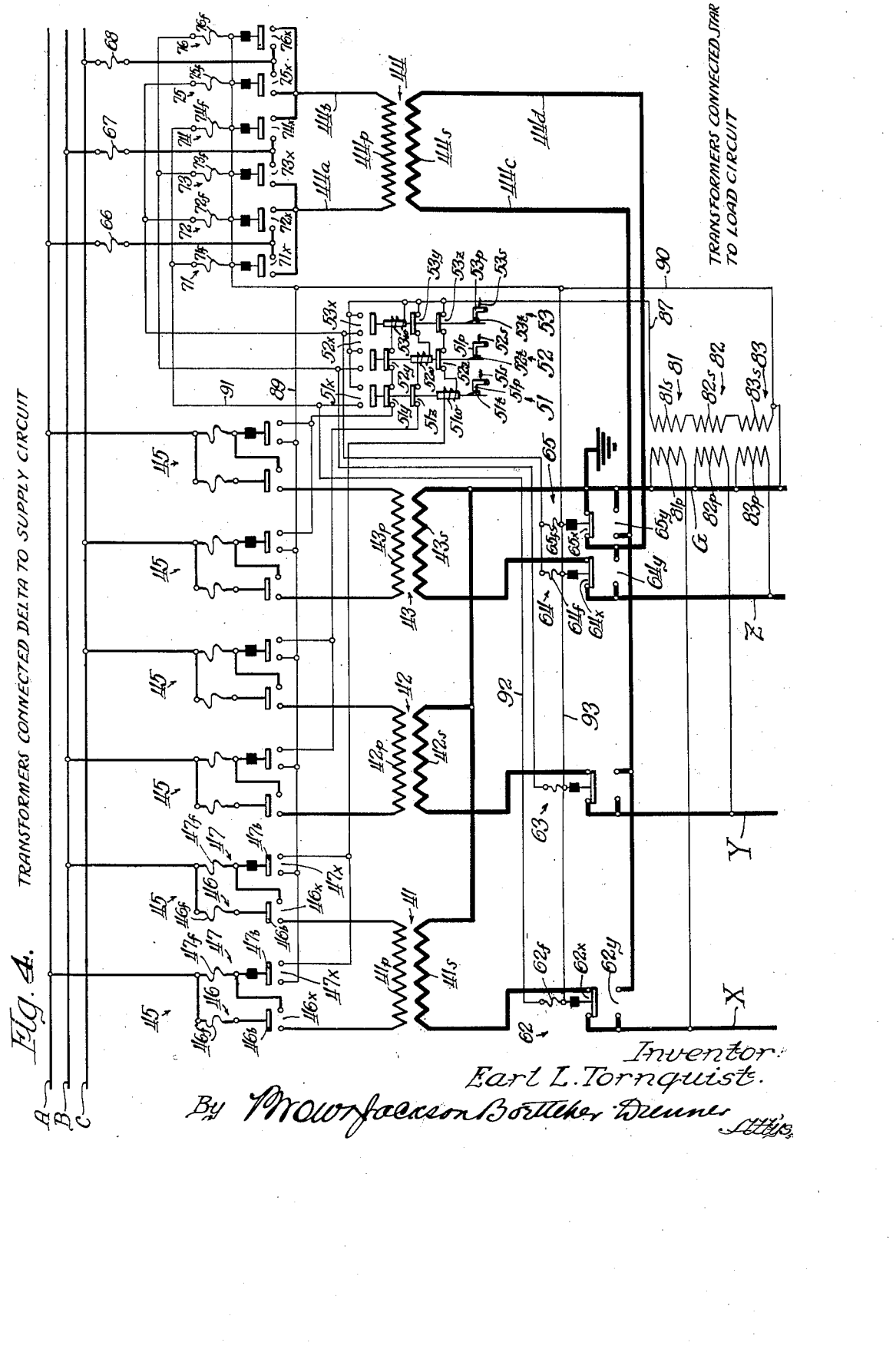
Figure 5:
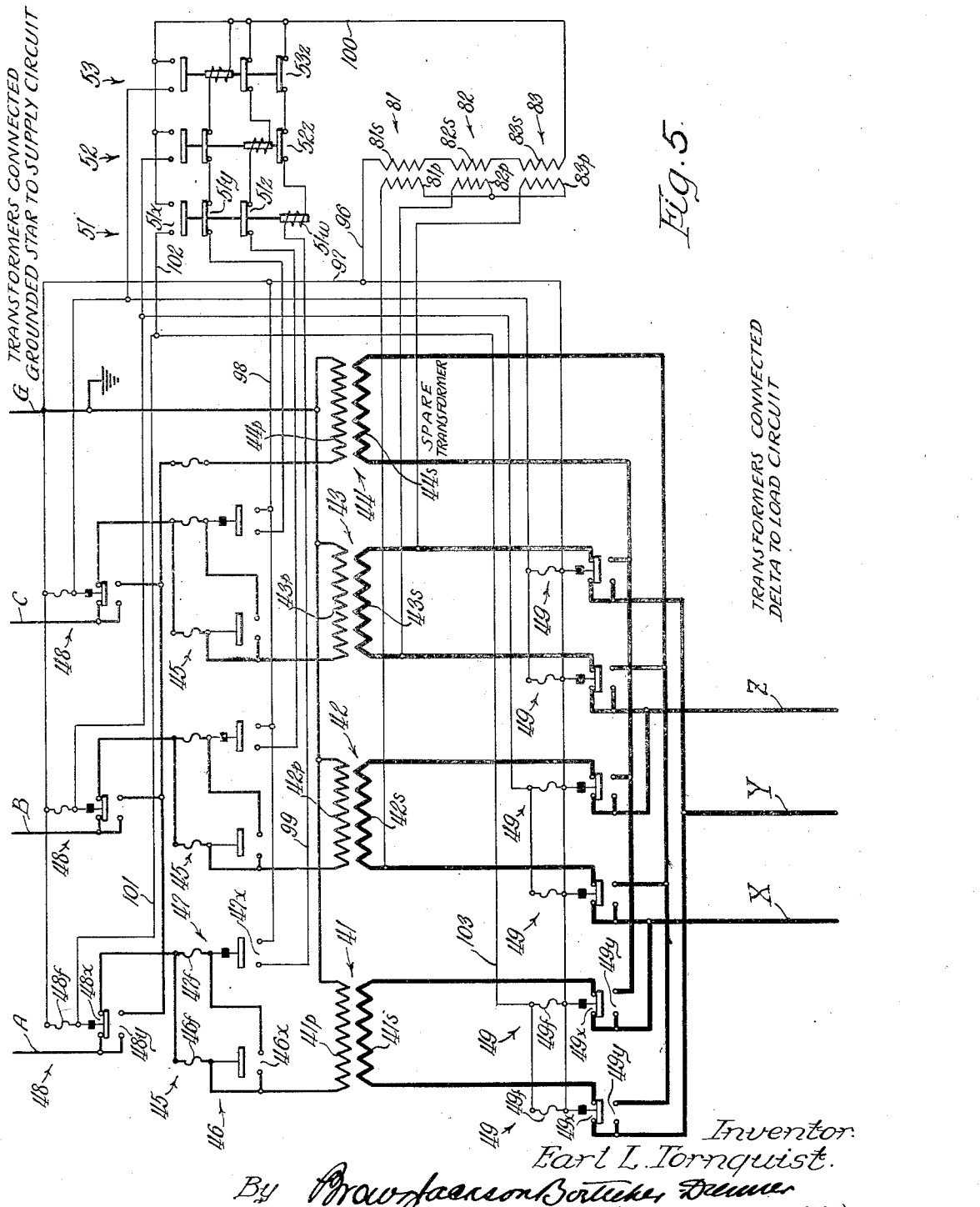
Figure 6:
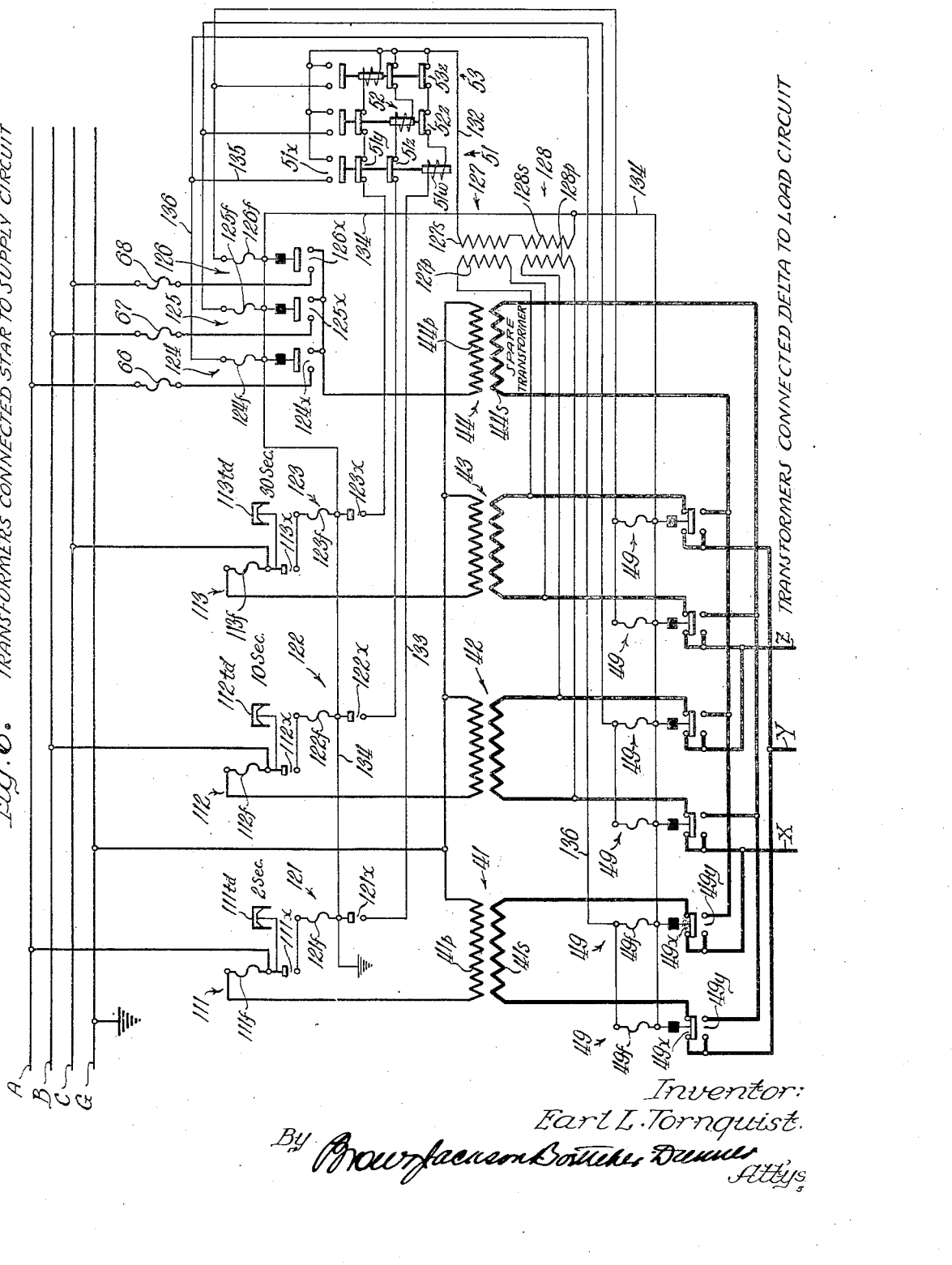

Figure 4 illustrates, diagrammatically, circuit connections similar to those shown in Figure 3 in which switches are provided for connecting the spare transformer to the supply circuit in such fashion as to require a minimum number of switches insulated for different voltages and in which the energy for effecting the switching operations is obtained from the secondary windings of the transformer bank;

Figure 5 illustrates, diagrammatically, the circuits that may be employed for substituting a spare transformer for any one of the transformers of a transformer bank, the transformers being connected grounded star to the supply circuit and delta to the load circuit;

Figure 6 illustrates circuits similar to those shown in Figure 5 in which a different scheme of control is employed for initiating the switching operations;

Figure 7:
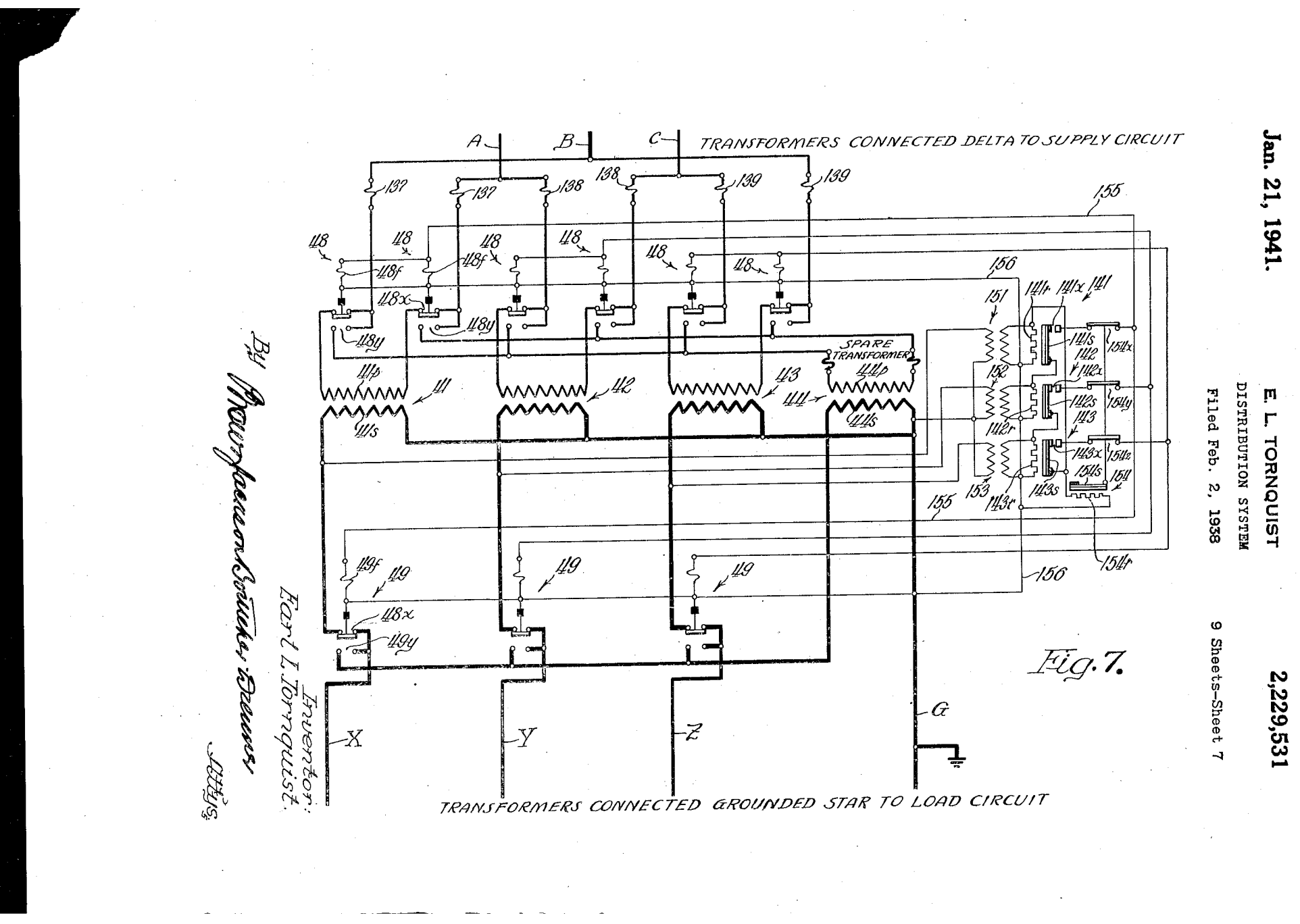

Figure 7 illustrates, diagrammatically, the circuits that may be employed for substituting a spare transformer for any one of the transformers of a bank, the switching operations being initiated as a result of the deenergization of one of the star connected secondary windings resulting from the deenergization of the corresponding delta connected primary winding;

Figure 8 shows circuits similar to those shown in Figure 7 but employing magnetic relays in place of bimetallic thermal relays for controlling the switching operations; and Figure 9 illustrates, diagrammatically, the circuit connections that may be employed for substituting a spare transformer for any one of the transformers in a bank of transformers connected grounded star to a supply circuit and delta to a load circuit in which the switching operations are initiated as a result of the deenergization of one of the primary windings.

Figure 1:
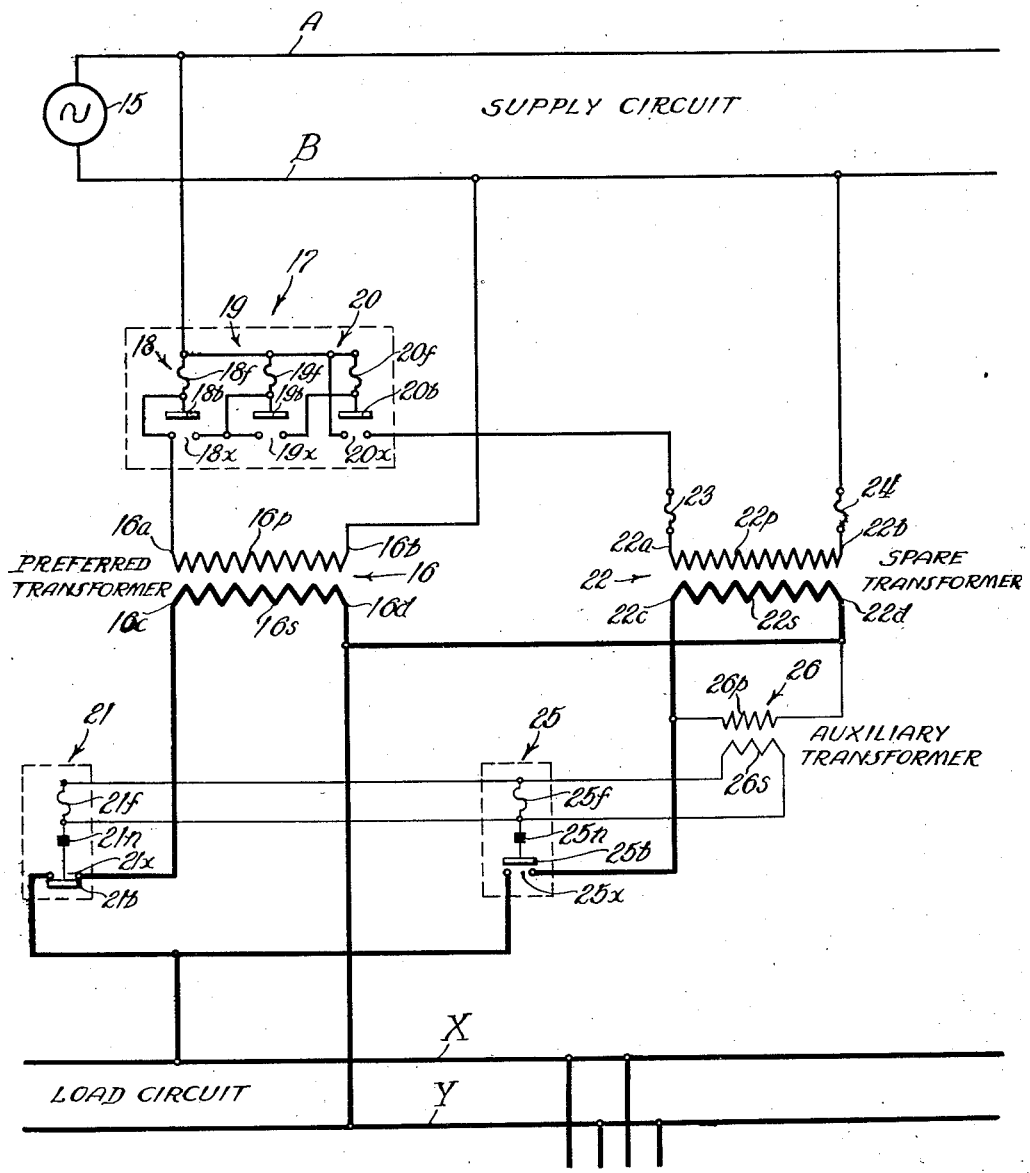
Figures 1 and 2 illustrate, diagrammatically, the connections that may be employed in substituting one single phase transformer for another on the occurrence of a fault in the latter transformer.

Reference will now be had to Figure 1 of the drawings where one embodiment of my invention is disclosed. The reference characters A and B designate the conductors of a supply circuit that may be energized from a suitable source of alternating current 15, such as a 60-cycle current source. The supply conductors A and B are connected to conductors X and Y of a load circuit, to which suitable feeder circuits may be connected, by means of a preferred transformer, shown generally at 16. The transformer 16 comprises a primary winding 16p and a secondary winding 16s.

The terminal 16b of the primary winding 16p may be connected directly to the conductor B of the supply circuit while the terminal 16a may be connected through a repeating fuse mechanism, shown generally at 17, to the conductor A of the supply circuit. The repeating fuse mechanism 17 is arranged to repeatedly reconnect the primary winding 16p of the preferred transformer 16 to the supply circuit for a number of times and then to effect a switching function which will be presently set forth.

The repeating fuse mechanism 17 may be of several different forms as is now well known to those skilled in the art. For example, it may be of the drop-out type in which a number of fuse housings containing fuse links are mounted to be successively interconnected in a circuit on the blowing of the fuse link in a preceding fuse housing. As each fuse link is blown, the fuse housing individual thereto drops longitudinally or rotates to an open-circuit position. During this movement to the open-circuit position, the circuit is shifted to the next fuse device and reestablished through its fuse link.

The repeating fuse mechanism 17 may also comprise a plurality of switches each of which is hold in the open position by a fusible element or fuse link. Initially only one of the fuse links is in the circuit. As soon as it blows, its switch is released to complete a circuit through the next fuse link for reestablishing the circuit. With this type of construction, it has been the practice to immerse the switch mechanisms in a suitable arc extinguishing liquid and to provide means for extinguishing the arcs drawn on blowing of the fuse link by the assistance of the arc extinguishing liquid. In other types, the switch mechanism is of the air break type and solid arc extinguishing material is employed to assist in extinguishing the arcs.

It will then be understood that the repeating fuse mechanism illustrated diagrammatically at 17 is merely illustrative of the various types of repeating fuse mechanisms that may be employed in practicing my invention. As shown, the repeating fuse mechanism 17 comprises fuse switches 18, 19, and 20. The fusible elements or links 18f, 19f, and 20f of which are arranged to be successively connected into the circuit between the conductor A and the terminal 16a of the primary winding 16p. Each fusible element or fuse link is arranged to control the movement of the bridging contact member 18b, 19b, and 20b, respectively, which are arranged to bridge contact members 18x, 19x, and 20x, respectively.

Assuming now that a fault occurs in one of the windings 16p or 16s of the preferred transformer 16, such as the occurrence of one or more short-circuited turns or a ground, sufficient current will flow to blow the fusible element or fuse link 18f. The circuit to the primary winding 16p will then be interrupted and current will cease to flow therethrough.

As a result of the blowing of the fusible element or fuse link 18f, the bridging contact member 18b is released and contact members 18x are bridged. The bridging of contact members 18x may take place immediately after the blowing of the fuse link 18f, or it may be delayed by the provision of suitable time delay means which, for example, may retard the movement of the bridging contact member 18b towards the contact members 18x. As soon as the contact members 18x are bridged, the circuit is reestablished through the fuse link 19f of the fuse switch 19.

If the fault in the transformer 16 has meanwhile cleared itself, then the transformer 16 can carry its normal load under ordinary operating conditions. However, if the fault still persists, the fuse link 19f will be blown and the bridging contact member 19b will be released to bridge the contact members 19x. The circuit will then be completed through the fuse link 20f. Ordinarily, if the fault still persists and the fuse link 20f is blown, the circuit to the primary winding 16p is not again reestablished and, as a result, the transformer 16 is deenergized. In such case the load circuit is also deenergized, and it is necessary to re-fuse the repeating fuse mechanism 17 and to either repair or replace the transformer 16.

When such a fault occurs in the transformer 16 that results in the blowing of all of the fuse links of the repeating fuse mechanism 17 and also requires the repair or replacement of the transformer 16, it is obvious that the load circuit will be deenergized for a considerable period of time. For many reasons this is undesirable and should be avoided.

As indicated hereinbefore, when the last fuse link 20f blows, the primary winding 16p is disconnected from the supply circuit. It is desirable that the secondary winding 16s be also disconnected from the load circuit for reasons which will presently be apparent. Therefore, a fuse switch, shown generally at 21, is provided which comprises a fuse link 21f that is arranged to hold a bridging contact member 21b in engagement with contact members 21x. It will be observed that the circuit from the terminal 16c of the secondary winding 16s is completed through the contact members 21x to the conductor X of the load circuit. It is desirable to insulate the fuse link 21f from the bridging contact member 21b. For this purpose an insulating connector 21n is provided therebetween. Obviously, any other suitable means may be employed.

The fuse switch 21 is different from the fuse switches 18, 19, and 20 making up the repeating fuse mechanism 17 in that its fuse link 21f is not blown as the result of a predetermined overload current flowing therethrough. Rather, it is intended to be blown under certain predetermined operating conditions in order to release the bridging contact member 21b from the contact members 12x and open the circuit therethrough.

As indicated hereinbefore, after the last fuse link 20f blows, no further operation ordinarily takes place. However, I have provided the fuse switch 20 with a bridging contact member 20b and contact members 20x which are arranged to connect a spare transformer, shown generally at 22, to the supply circuit in place of the preferred transformer 16 in the event that a fault occurs in the latter. As shown, the spare transformer 22 comprises a primary winding 22p that may be connected through fuses 23 and 24 to the conductors A and B of the supply circuit. It will be observed that the terminal 22b of the primary winding 22p is connected to the conductor B of the supply circuit while terminal 22a is arranged to be connected through the contact members 20x to the conductor A of the supply circuit.

Normally, the terminal 22d of the secondary winding 22s is connected to the conductor Y of the load circuit as is also the terminal 16d of the secondary winding 16s of the preferred transformer.

In order to connect the terminal 22c of the secondary winding 22s to the conductor X of the load circuit, a fuse switch, shown generally at 25, is provided.

This fuse switch is similar to the fuse switch 21 in that it is provided with a fuse link 25f, an insulating connector 25n, a bridging contact member 25b, and contact members 25x. However, the bridging contact member 25b is normally held out of engagement with the contact members 25x. On blowing of the fuse link 25f, the bridging contact member 25b is released, and contact members 25x are bridged.

With a view to blowing the fuse links 21f and 25f in order to disconnect the secondary winding 16s from and the secondary winding 22s to the load circuit, an auxiliary transformer, shown generally at 26, may be provided having a primary winding 26p connected across the secondary winding 22s of the spare transformer. The auxiliary transformer 26 is also provided with a secondary winding 26s, the terminals of which are connected across the fuse links 21f and 25f, as shown.

Now when a fault occurs in the preferred transformer 16 of such nature that all of the fuse links 18f, 19f, and 20f of the repeating fuse mechanism 17 are blown, it will be obvious that the supply circuit is connected to the load circuit through the spare transformer 22. As a result, the continued energization of the load circuit is assured, it being interrupted for only a time sufficient to effect the transfer from the preferred transformer 16 to the spare transformer 22.

It is desirable to disconnect the secondary winding 16s from the load circuit when the spare transformer 22 is interconnected between the circuit in order to prevent a feed back into the fault in the preferred transformer 16. During the normal operation of the preferred transformer 16, it is desirable to maintain the secondary winding 22s of the spare transformer 22 disconnected from the load circuit and in order to avoid the losses incident to having the spare transformer continuously energized.

It is desirable to open the contact members 21x of the fuse switch 21 and disconnect the secondary winding 16s of the preferred transformer prior to the closure of the contact members 25x of the fuse switch 25 and the connection of the secondary winding 22s of the spare transformer to the load circuit. Such operation may be insured by providing a time-delay mechanism in the fuse switch 25 which will delay the movement of the bridging contact member 25b to such an extent that, after the fuse links 21f and 25f are simultaneously blown, the contact members 21b will have opened the circuit to the secondary winding 16s before the circuit is closed to the secondary winding 22s. This sequential effect may also be obtained by using only a single fuse link in place of the two fuse links 21f and 25f and having it control both the opening of the one circuit and the closing of the other. Such a construction will presently be described.

In the circuit connections shown in Figure 1 of the drawings, one terminal of each of the primary windings 16p and 22p is connected directly to the conductor B of the supply circuit. Likewise, one terminal of each of the secondary windings 16s and 22s is connected directly to the conductor Y of the load circuit. The switching of the preferred transformer out of the circuit and the spare transformer into the circuit is effected by the use of the remaining terminals. There are some instances where it is desirable to have all of the terminals of the windings of the spare transformer normally disconnected from the supply and the load circuits and to have all of the terminals of the preferred transformer disconnected from these circuits when the spare transformer is interconnected therebetween. For this purpose the circuit connections shown in Figure 2 may be employed.

Figure 2:
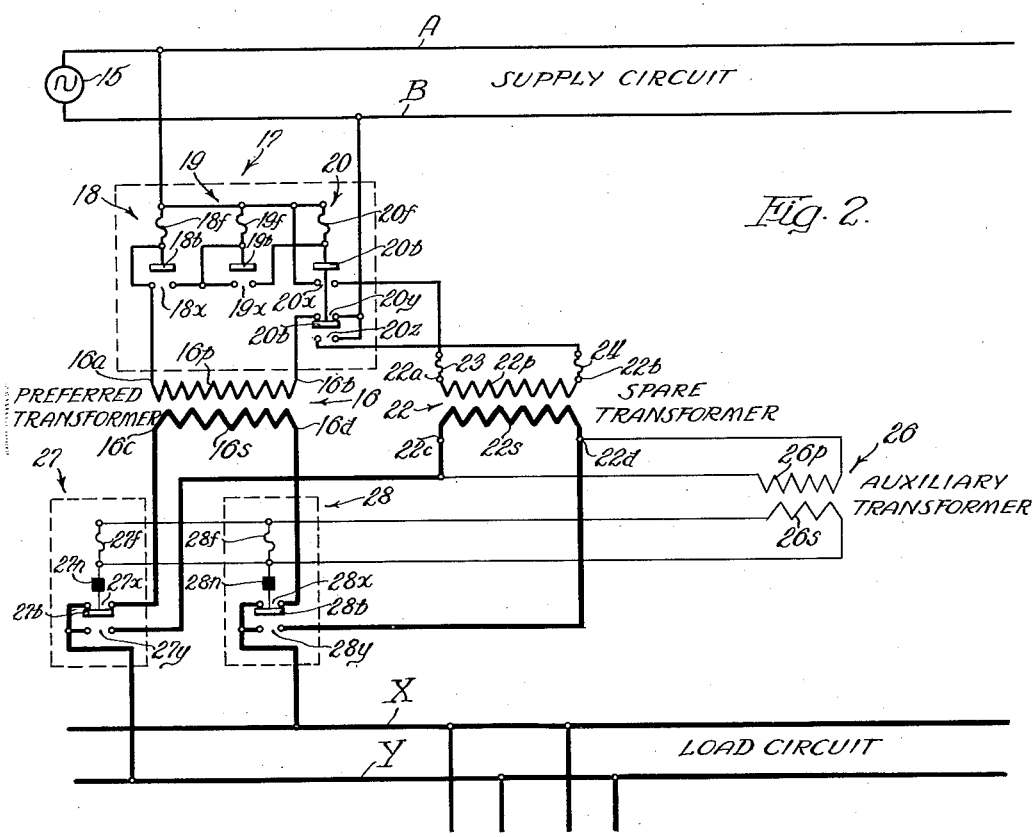

As shown in Figure 2 of the drawings, the fuse switch 20 of the repeating fuse mechanism 17 is provided with a second bridging contact member 20b for bridging either contact members 20y or 20z. Normally, the circuit to the terminal 16b of the primary winding 16p is completed from the conductor B of the supply circuit through contact members 20y. On blowing of the last fuse link 20f, the terminal 16a is, of course, disconnected from the conductor A of the supply circuit and, since the bridging contact member 20b is released, contact members 20y are no longer bridged and terminal 16b is disconnected from the conductor B. Shortly thereafter, when contact members 20z are bridged, the terminal 22b of the primary winding 22p of the spare transformer 22 is connected to the conductor B.

The secondary windings 16s and 22s of the preferred and spare transformers 16 and 22, respectively, may be connected to the conductors X and Y of the load circuit through fuse switches shown generally at 27 and 28. These fuse switches are provided with fuse links 27f and 28f, insulating connectors 27n and 28n, bridging contact members 27b and 28b, contact members 27x and 28x, normally bridged, and contact members 27y and 28y, normally open, respectively.

When such a fault has occurred in the preferred transformer 16 that the fuse link 20f of the repeating fuse mechanism 17 has blown, both terminals of the primary winding 16p of the preferred transformer 16 are disconnected from the supply circuit and subsequently both terminals of the primary winding 22p of the spare transformer 22 are connected thereto. The auxiliary transformer 26 will then be energized and the fuse links 27f and 28f will be blown. This will result in first the disconnection of the secondary winding 16s from the load circuit and then the connection of the secondary winding 22s of the spare transformer 22 thereto. Since the secondary winding 16s of the preferred transformer 16 must first be disconnected from the load circuit before the secondary winding 22s of the spare transformer 22 is connected thereto, there is no likelihood of a feed back to the fault in the preferred transformer.

It will be obvious that one of the fuse switches 27 or 28 shown in Figure 2 may be substituted for both of the fuse switches 21 and 25 shown in Figure 1 of the drawings. In such case it is unnecessary to consider the provision of time-delay means in order to prevent a possible feed back.

While, for illustrative purposes, the fuse mechanism 17 has been shown in Figures 1 and 2 of the drawings, as being capable of reclosing the circuit to the preferred transformer two times, it will be understood that additional fuse switches may be provided for reclosing the circuit a greater number of times. Likewise, a fewer number of reclosures may be provided for and, if desired, the transfer to the spare transformer may be arranged to take place immediately upon the blowing of the fuse link 18f of the first fuse switch 18.

As indicated hereinbefore, when a polyphase transformer bank is employed to interconnect a polyphase supply circuit with a polyphase load circuit, it is customary to provide therewith a spare transformer. However, insofar as I am aware, no one prior to this invention has provided for automatically substituting the spare transformer for any one of the transformers in the bank on the occurrence of a fault therein such as would require the disconnection thereof from the supply and load circuits and either repair or replacement, It is to effect this substitution that I have provided the circuit connections and apparatus shown in Figure 4.

As shown in Figure 3 of the drawings, a transformer bank comprising transformers 41, 42, and 43 is provided, each having primary and secondary windings. For example, the transformer 41 is provided with a primary winding 41p and a secondary winding 41s. A spare transformer 44 is also provided having a primary winding 44p and a secondary winding 44s. The primary windings of the transformers 41, 42, and 43 are arranged to be connected delta to the conductors A, B, and C of a three phase supply circuit. The secondary windings of these transformers are connected star to a load circuit comprising the conductors X, Y, and Z. The neutral points of the secondary windings may be connected to a ground conductor G, as illustrated.

It will be observed that each terminal of each primary winding of the transformers 41, 42, and 43 is connected through a repeating fuse mechanism 45 to the respective conductors A, B, and C. These repeating fuse mechanisms are identical, and each may comprise fuse switches 46 and 47 which comprise fuse links 46f and 47f, bridging contact members 46b and 47b, and normally open contact members 46x and 47x, respectively. An insulating connector 47n is provided between the fuse link 47f and the bridging contact member 47b for reasons previously stated.

While two fuse switches 46 and 47 are illustrated as comprising each of the repeating fuse mechanisms 45, it will be understood that a larger number may be employed if desired. Also, only a single one may be employed if it is not desired to effect one or more reclosures. It will also be apparent that only one of the repeating fuse mechanisms 45 may be employed per phase rather than two of them, as shown.

In order to completely isolate both terminals of each of the primary windings of the transformers 41, 42, and 43, they are individually connected through fuse switches 48 to the conductors A, B, and C of the supply circuit. As shown, each fuse switch comprises a fuse link 48f, an insulating connector 48n, contact members 48x normally bridged by a bridging contact member 48b and contact members 48y that are normally open. It will be observed that the terminals of the primary winding 41p of the transformer 41, for example, are connected to contact members 48x of the two lefthand fuse switches 48 to the conductors B and A, respectively, of the supply circuit. The contact members 48y of these two fuse switches are connected to the terminals of the primary winding 44p of the spare transformer 44 for connecting the same to these two conductors in place of the primary winding 41p of the transformer 41.

It will be observed that the middle two fuse switches 48 are connected respectively to the conductors A and C of the supply circuit and to the terminals of the primary winding of the transformer 42. It will also be noted that these fuse switches are commonly connected to the primary winding 44p of the spare transformer 44 with the first pair of fuse switches 48 for the purpose of connecting the primary winding 44p to the conductors A and C in place of the primary winding of the transformer 42.

The righthand pair of fuse switches 48 is connected respectively to the conductors C and A and to the primary winding of the transformer 43. Like the other two pairs of fuse switches, these fuse switches are also commonly connected to the primary winding 44p of the spare transformer.

In the event that any one of the transformers 41, 42, and 43 is disconnected from the supply circuit, it is desirable that the corresponding secondary winding be disconnected from the load circuit to prevent feed back. Also, on connection of the spare transformer to the supply circuit in place of any one of the transformers, it is necessary that the secondary winding 44s be substituted for the corresponding secondary winding of the transformer that has been disconnected from the load circuit. For this purpose, a fuse switch 49 is provided individual to each of the secondary windings of the transformers 41, 42, and 43 and common to the secondary winding 44s of the spare transformer 44.

As shown, a fuse switch 49 may be connected to the secondary winding 41s of the transformer 41. This fuse switch comprises a fuse link 49f, an insulating connector 49n, contact members 49x normally bridged by a bridging contact member 49b and normally open contact members 49y. On blowing of the fuse link 49f, the contact members 49x are no longer bridged and contact members 49y are bridged to interconnect the secondary winding 44s with the conductor X of the load circuit.

Since the secondary windings of the transformers 41, 42, and 43 are star connected, their neutral points and one terminal of the secondary winding 44s may be commonly connected and grounded as illustrated.

With a view to effecting the desired operation of the system, control relays shown generally at 51, 52, and 53 are provided, each relay being individual to one of the transformers 41, 42, and 43, respectively. As shown, each relay is provided with normally open contact members 51x, 52x, and 53x, respectively. Also, the relays are provided with normally closed contact members 51y, 52y, and 53y, respectively, and normally closed contact members 51z, 52z and 53z, respectively. Operating windings 51w, 52w, and 53w are also provided. It will be observed that the operating winding 51w is connected to the normally open contact members 47x of the fuse switches 47 of the lefthand pair of repeating fuse mechanisms 45. The windings 52w and 53w are respectively connected to the corresponding normally open contact members of the fuse switches individual to the transformers 42 and 43.

A battery 54 may be provided for supplying the current necessary to energize the windings 51w, 52w, and 53w and for blowing the fuse links of the various fuse switches where necessary. As will appear hereinafter, the necessary energy for operating the system may be obtained from one or the other sides of the transformers 41, 42, and 43 as may be preferable.

In describing the operation of the system shown in Figure 3, it will first be assumed that the transformers 41, 42, and 43 are normally supplying energy from the supply circuit comprising the conductors A, B, and C to the load circuit comprising the conductors X, Y, and Z. It will also be assumed that a fault occurs in the transformer 41 of such a nature that the fuse link 46f of the first fuse switch 46 blows.

Contact members 46x are then closed, and the circuit is reestablished through the next fuse link 47f. If the fault persists, this fuse link will be blown, and contact members 47x will be closed. The fault may be of such a nature that, at the time that the first fuse link 46f is blown, the fuse link 46f of the second repeating fuse mechanism 45 may also be blown. Likewise, the next fuse link 47f may also be blown and contact members 47x thereof closed. It will be understood that either or both of these sets of repeating fuse mechanisms may be operated depending upon the nature of the fault in the transformer 41.

In either case, on the closure of the contact members 47x, a circuit is completed for energizing the winding 51w of the relay 51 through contact members 52z and 53z to the battery 54. The remaining portion of the circuit is obvious and will not be traced.

As a result of the energization of the winding 51w, contact members 51x are closed and circuits are completed for blowing the fuse links 48f of the two lefthand fuse switches 48 and the fuse link 49f of the fuse switch 49, all of which are individual to the transformer 41.

The circuit for blowing the fuse links 48f may be traced from the battery 54 through conductor 55, contact members 51x, conductor 56, fuse links 48f, and conductors 57 and 58 to the battery 54. The circuit for blowing the fuse link 49f may be traced from the battery 54 through conductor 55, contact members 51x, conductors 56 and 59, fuse link 49f, and conductor 58 to the battery 54.

Since the two lefthand fuse switches 48 are simultaneously operated, the primary winding 41p of the transformer 41 is completely disconnected from the supply circuit and the primary winding 44p of the spare transformer 44 is connected thereto. Likewise, since the fuse switch 49 is also operated, one terminal of the secondary winding 41s is disconnected from the load circuit and subsequently a corresponding terminal of the secondary winding 44s of the spare transformer 44 is connected thereto.

The transformer bank then continues to function with the spare transformer 44 substituted for the transformer 41 between the supply circuit and the load circuit. Fuses 60 and 61 may be provided, if desired, to protect the spare transformer 44. Had the fault occurred in either the transformer 42 or the transformer 43, similar switching operations would take place to substitute the spare transformer 44 for the transformer in which the fault occurred.

Once the spare transformer 44 has been substituted for one of the transformers 41, 42, or 43, it is undesirable that any further switching operation take place. It is for this purpose that the normally closed contact members are provided on the control relays 51, 52, and 53.

It will be observed that the winding 51w of the relay 51 remains energized after the transformer 41 is disconnected from the supply and load circuit. Accordingly, normally closed contact members 51y and 51z are opened. As a result, even if a fault develops in either of the transformers 42 or 43 and circuits would be completed that would otherwise energize windings 52w and 53w, it will be apparent that this cannot occur since the energizing circuits for these windings will be open at contact members 51y and 51z. As will appear hereinafter, mechanical latch means may be employed for holding the relays 51, 52, and 53 in the operated position so that it is unnecessary to depend upon the energization of the windings 51w, 52w, and 53w to insure that a second transfer is not attempted. This interlocking feature is important since, if it were not provided, one or more short circuits might be set up in the connections to the transformers.

Once the substitution of the spare transformer 44 has been made for any one of the transformers 41, 42, or 43, the transformer disconnected from the circuit may be repaired or replaced as the case may be. The blown fuse links are replaced, and the system is restored to its initial operating condition with the spare transformer 44 arranged to be substituted for any one of the transformers 41, 42, or 43 on the next occurrence of a fault in any one of them.

The spare transformer 44 may be protected by the fuses 60 and 61 which are connected, as illustrated, directly to the primary winding 44p.

In the system shown in Figure 3 of the drawings, six of the fuse switches 48 are employed to connect the primary winding 44p of the spare transformer 44 to the supply circuit in place of any one of the primary windings of the transformers 41, 42, or 43. These fuse switches should be separately mounted and separately insulated in accordance with the voltage of the supply circuit. When the voltage of the supply circuit is of the order of several thousands of volts, the expense involved in separately insulating the fuse switches 48 is considerable. With a view to reducing this expense while still providing for automatically substituting the spare transformer for any one of the transformers in the bank, the circuit connection shown in Figure 5 may be employed.

As shown in Figure 4 of the drawings, transformers 41, 42, and 43 are arranged to interconnect a supply circuit comprising the conductors A, B, and C with a load circuit comprising conductors X, Y, and Z and a ground conductor G. The primary windings of the transformers 41, 42, and 43 are connected delta through repeating fuse mechanisms 45 to the supply circuit and are connected star through fuse switches 62, 63, 64, and 65 to the load circuit while the secondary windings 41s and 42s are connected by means of fuse switches 62 and 63, respectively, to the load circuit, the secondary winding 43s is connected to the load circuit by means of two fuse switches 64 and 65 for a purpose that will presently be apparent. The neutral points of the secondary windings 41s, 42s, and 43s are connected to ground, as shown.

It will be observed that the fuse switches 48, shown in Figure 3, are omitted and that the primary winding 44p of the spare transformer 44 is arranged to be connected through fuses 66, 67, and 68 to the supply circuit comprising the conductors A, B, and C. Three pairs of fuse switches 71 and 72, 73 and 74, and 75 and 76 are provided for interconnecting the primary winding 44p of the spare transformer 44 to the supply circuit in accordance with which transformer 41, 42, or 43 must be disconnected from the circuits. Each of these fuse switches comprises fuse links 71f through 76f, respectively, and normally open contact members 71x through 76x, respectively. The terminal 44a of the primary winding 44p is commonly connected to the contact members 71x, 72x, and 73x while the terminal 44b of the primary winding 44p is connected to the contact members 74x, 75x, and 76x. Since the fuse switches 71 and 72 are commonly connected to the conductor A, fuse switches 73 and 74 are commonly connected to the conductor B, and fuse switches 75 and 76 are commonly connected to the conductor C, it is only necessary to provide three sets of insulation for these six switches in place of the six sets for the arrangement shown in Figure 3 of the drawings.

The secondary winding 44s of the spare transformer 44 may be connected to the load circuit through the fuse switches 62, 63, 64, and 65. Normally, the terminal 44d of the secondary winding 44s is connected through normally closed contact members 65x of the fuse switch 65 to the ground conductor G of the load circuit. This connection is correct when the secondary winding 44 is to be substituted for either of the secondary windings of the transformers 41 and 42. However, with the connections as shown for the fuse switches 71 through 76, it is necessary to reverse the connections of the secondary winding 44s when it is to be substituted for the secondary winding of the transformer 43. When this operation is initiated, both of the fuse switches 64 and 65 are operated since the fuse links 64f and 65f thereof are connected in parallel. When the fuse switch 65 is operated, the connection of the terminal 44d to the ground conductor G is opened at contact members 65x. At contact members 65y the terminal 44c is then connected to the ground conductor G. At the same time on operation of the fuse switch 64 the terminal 44d is connected at contact members 64y to the load circuit conductor Z.

The relays 51, 52, and 53 are provided and are arranged to be operated as previously described. Instead of depending upon the winding of the operated relay remaining energized and holding it in the operated position, mechanical latch means may be provided for this purpose. The stem of each of the relays 51, 52, and 53 may be provided with a tooth 51t, 52t, and 53t respectively arranged to be engaged underneath on operation of the individual relay by a pawl 51p, 52p, and 53p, each being biased by springs 51s, 52s, and 53s.

In lieu of employing a separate source, such as the battery 54 as shown in Figure 3, for effecting the various control functions, I have provided in Figure 4 means comprising transformers 81, 82, and 83 for supplying the necessary control current. These transformers are provided with primary windings 81p, 82p, and 83p which are connected respectively across the secondary windings of the transformers 41, 42, and 43. The secondary windings 81s, 82s, and 83s of the transformers 81, 82, and 83 are connected in series circuit relation as shown. Although the voltages in these secondary windings will add vectorially rather than arithmetically, there will always be present a resulting voltage from the combination of at least two of them to effect the necessary control functions. It will be understood that the voltage required for performing the various control functions is not critical and that it may vary over a considerable range without adversely affecting the desired functioning. Ordinarily, only two of the phase voltages will be available for effecting the necessary control functions since, at the time that they are required, one of the transformers 41, 42, or 43 has been deenergized by operation of one of the repeating fuse mechanisms 45.

It will now be assumed that a fault has occurred in the transformer 41, and that one or both of the fuse links 47f of the last fuse switch in each of the repeating fuse mechanisms 45 individual thereto have blown thereby closing contact members 47x of either or both of these fuse switches. A circuit is then completed for energizing the winding 51w of the control relay 51 to effect the operation of the fuse switches 71 and 74 for connecting the primary winding 44p to conductors A and B of the supply circuit and of fuse switch 62 to disconnect the secondary winding 41s from load circuit conductor X and to 55 terminal 44c of the secondary winding 44s to this conductor.

The circuit for energizing the winding 51w may be traced from the transformer 81 through conductor 87, normally closed contact members 53z and 52z, winding 51w, conductor 88, contact members 47x, and conductors 89 and 90 to the transformer 83.

The circuit for blowing the fuse links 71f and 74f may be traced from the transformer 81 through conductor 87, contact members 51x, conductor 91, fuse links 71f and 74f, and conductor 90 to the transformer 83.

The circuit for blowing the fuse link 62f may be traced from the transformer 81 through conductor 87, contact members 51x, conductor 92, fuse link 62f, and conductors 93 and 90 to the transformer 83.

As a result of the blowing of these fuse links 71f, 74f, and 62f, the transformer 44 is interconnected between the supply and load circuits in place of the transformer 41.

Since the control relay 51 remains in the operated condition due not only to the winding 51w remaining energized but also due to the pawl 51p engaging the under surface of the tooth 51t, contact members 51y and 51z will remain open and the operation of the other two control relays 52 and 53 will be prevented. Thus, even though the supply circuit should subsequently be completely deenergized and then again energized and a fault should occur in either the transformer 42 or the transformer 43, there would be no further exchange in the functioning of the system because of this interlocking feature.

Since the manner in which the spare transformer 44 is substituted for either of the transformers 42 or 43 will now be obvious, a detailed description thereof will not be set forth.

In Figure 5 of the drawings I have illustrated the manner in which the spare transformer 44 may be substituted for any one of the transformers 41, 42, or 43 when these transformers are connected star to the supply circuit and delta to the load circuit. Since the neutral points of the primary windings of the transformers 41, 42, and 43 are commonly connected together and to ground, it is only necessary to provide one repeating fuse mechanism 45 for each of these transformers 41, 42, and 43. As previously described, each of these repeating fuse mechanisms may comprise fuse switches 46 and 47 in order to effect one reconnection of the primary winding individual thereto to the corresponding conductor of the supply circuit. Fuse switches 48, one individual to each transformer, are provided for shifting the connections to the primary winding 44p of the spare transformer 44.

Since the secondary windings 41s, 42s, and 43s of the transformers 41, 42, and 43 are connected delta to the load circuit, it is necessary to provide two fuse switches 49 for each of them. Both fuse switches 49 individual to each secondary winding are operated for disconnecting it from the load circuit and for connecting the secondary winding 44s of the spare transformer 44 to the load circuit in the delta relation.

It will be assumed that a fault has occurred in the transformer 41 such that the fuse link 47f has blown, thereby effecting the closure of contact members 47x. Control relay 51 is then operated to effect the operation of the fuse switches 48 and 49 individual to the transformer 41 with the result that the spare transformer 44 is interconnected between the supply circuit and the load circuit in place of the transformer 41.

The circuit for energizing the winding 51w of the control relay 51 may be traced from the transformer 81 through conductors 96, 97, and 98, contact members 47x, conductor 99, winding 51w, contact members 52z and 53z and conductor 100 to the transformer 83.

Contact members 51x are closed to effect the blowing of the fuse links 48f and 49f. The circuit for blowing the fuse link 48f may be traced from the transformer 81 through conductors 96 and 97, fuse link 48f, conductors 101 and 102, contact members 51x, and conductor 100 to the transformer 83. The circuit for blowing the fuse links 49f may be traced from the transformer 81 through conductors 96 and 97, fuse links 49f, conductors 103 and 102, contact members 51x, and conductor 100 to the transformer 83.

Since the control relay 51 remains in the energized condition, contact members 51y and 51z thereof are held open and operation of the relays 52 or 53 is prevented even though a fault should occur in either the transformer 42 or the transformer 43. The windings of the control relays 51, 52, and 53 are so designed that these relays will remain energized even though only one of the transformers 81, 82, or 83 is energized. At the same time they are also designed to withstand the voltage that may be impressed thereon when all of the transformers 81, 82, and 83 are energized. Normally, however, the voltage of two of the transformers 81, 82, and 83 will be applied to any one of the windings of the control relays 51, 52, and 53.

In Figure 6 of the drawings, the transformers 41, 42, and 43 are normally connected star through fuse switches 111, 112, and 113 to the supply circuit comprising the conductors A, B, and C and a ground conductor G. While only a single fuse unit is provided for each of these fuse switches, it will be understood that repeater fuse mechanisms may be employed if desired. Each of the fuse switches is provided with a fuse link 111f, 112f, 113f arranged to hold contact members 111x, 112x, and 113x, respectively, open. In order to prevent simultaneous closure of these contact members, time-delay means 111td, 112td, and 113td are provided. These time-delay mechanisms may be of a suitable dashpot or other type as may be desired. The time-delay mechanism 111td may be adjusted for two seconds, the time-delay mechanism 112td may be adjusted for ten seconds, and the time-delay mechanism 113td may be adjusted for thirty seconds as illustrated. Obviously, the time-delay mechanism 111td may be omitted when the other two time-delay mechanisms are employed.

As a result of the closure of contact members 111x, 112x, or 113x, control fuse switches 121, 122, or 123, respectively, are operated. These control fuse switches are provided with fuse links 121f, 122f, and 123f, respectively, that are arranged to hold contact members 121x, 122x, and 123x in the open condition.

In order to connect the primary winding 44p of the spare transformer 44 to the supply circuit, fuse switches 124, 125, and 126 are provided each individual to one of the supply conductors A, B, or C. These fuse switches are provided with fuse links 124f, 125f, and 126f, respectively, and normally open contact members 124x, 125x, and 126x, respectively. Since the transformers 141, 142, and 143 are connected star to the supply circuit, one terminal of the primary winding of the spare transformer 44 may be connected to the neutral ground while the other terminal is commonly connected to the contact members 124x, 125x, and 126x.

Energy for performing the necessary control functions may be obtained from transformers 127 and 128. The primary winding 127p of the transformer 127 may be connected across the secondary winding of the transformer 43 while the primary winding of the transformer 128 may be connected across the secondary winding of the transformer 42. Since the transformers 41, 42, and 43 are connected delta to the load circuit, it is unnecessary to provide a third transformer for the third phase. The secondary windings 127s and 128s are connected in series circuit relation for the purpose previously described.

It will be assumed that a fault has occurred in the transformer 41 such that the fuse link 111f of the fuse switch 111 is blown. As a result, contact members 111x are closed after a time determined by the time delay mechanism 111td and the fuse link 121f of the control fuse switch 121 is connected to the conductor A of the supply circuit. Since the other terminal of the fuse link 121f is connected to ground, as shown, this fuse link is immediately blown and contact members 121x are closed. Relay 51 is then energized. Fuse link 124f is blown to connect the primary winding 44p of the spare transformer 44 to the conductor A of the supply circuit. Fuse links 49f of the fuse switches 49 individual to the secondary winding 41s of the transformer 41 are also blown to connect the secondary winding 44s of the spare transformer 44 to the load circuit in place of the secondary winding 41s. The load circuit continues to be energized with the spare transformer 44 substituted for the transformer 41.

The circuit for energizing the winding 51w may be traced from the transformer 127 through conductor 132, contact members 53z and 52z, winding 51w, conductor 133, contact members 121x, and conductor 134 to the transformer 128.

The fuse links 124f and 49f are blown as the result of the closure of contact member 51x. The circuit for blowing the fuse link 124f may be traced from the transformer 127 through conductor 132, contact members 51x, conductors 135 and 136, fuse link 124f, and conductor 134 to the transformer 128. The circuit for blowing the fuse links 49f may be traced from the transformer 127 through conductor 132, contact members 51x, conductors 135 and 136, fuse links 49f, and conductor 134 to the transformer 128.

Since the winding 51w of the control relay 51 remains energized until the fuse link 121f is replaced and contact members 121x are opened, contact members 51y and 51z remain open and operation of the relays 52 and 53 in response to a fault occurring in either the transformer 42 or the transformer 43 is prevented.

In Figure 7 of the drawings I have shown a system for substituting the spare transformer 44 for any one of the transformers 41, 42, or 43 on deenergization of any one of them. The transformers 41, 42, and 43 are connected delta to the supply circuit comprising the conductors A, B, and C, and are connected star to the load circuit comprising the conductors X, Y, and Z. The neutral points of the secondary windings are connected commonly to the ground conductor G. The transformers 41, 42, and 43 are connected through fuse switches 48 and fuses 137, 138, and 139, as illustrated, to the conductors A, B, and C of the supply circuit. On blowing of either or both of the fuses 137 or 138 or 139, the transformer individual thereto will be deenergized.

In order to take advantage of the deenergization of one of the transformers 41, 42, or 43 for initiating the desired control function, bimetallic thermal relays 141, 142, and 143 are provided. The construction of these relays is as described hereinbefore. Each relay comprises respectively bimetallic strips 141s, 142s, and 143s, carrying contact members 141x, 142x, and 143x.

Resistors 141r, 142r, and 143r are provided for energizing these relays. These resistors are connected across the secondary windings of transformers 151, 152, and 153, the primary windings of which are connected respectively across the secondary windings of the transformers 41, 42, and 43. An auxiliary bimetallic relay 154 is provided comprising a bimetallic strip 154s and a resistor 154r together with contact members 154x, 154y, and 154z, for preventing false operation of the system on its initial energization.

It will first be assumed that the transformers 41, 42, and 43 are normally operating to interconnect the supply and load circuits. Under these conditions the transformers 151, 152, and 153 will be energized and contact members 141x, 142x, and 143x will be in the open condition, as shown, since the resistors individual thereto are energized. Since the resistor 154r of the auxiliary relay 154 is also energized, contact members 154x, 154y, and 154z are closed.

Assuming now that a fault occurs in the transformer 41, one or both of the fuses 137 blows with the result that the secondary winding 41s is deenergized. Transformer 151 is also deenergized and, since the resistor 141 is no longer heated, the strip 141s warps to close contact members 141x. A circuit is then completed for blowing the fuse links 48f and 49f individual to the fuse switches connected to the transformer 41. As a result, this transformer is disconnected from the supply and load circuit and the spare transformer 44 is substituted therefor.

The circuit for blowing the fuse links 48f may be traced from the transformer 152 through the strip 141s, contact members 141x, contact members 154x, conductor 155, fuse links 148f, and conductor 156 to the transformer 152. The circuit for blowing the fuse link 149f may be traced from the transformer 152 through strip 141s, contact members 141x, contact members 154x, conductor 155, fuse link 49f, and conductor 156 to the transformer 152.

It will be observed that energy for blowing the fuse links of the fuse switches individual to one transformer 41, 42, or 43 is obtained from the next transformer 152, 153, or 151, respectively.

When the supply circuit is deenergized, the control relays 141, 142, and 143 are, of course, deenergized and contact members 141x, 142x, and 143x are closed. On energization of the supply circuit, since these contact members are closed, there is the possibility of a false operation occurring before these contact members have been opened for normal operation. It is to prevent this false operation that the auxiliary relay 154 is provided. When the system is deenergized, its contact members 154x, 154y, and 154z are normally open. Thus, on energization of the supply circuit, although the contact members of the control relays 141, 142, and 143 are closed, they are ineffective to complete operating circuits for blowing the fuse links individual thereto. A predetermined time after the system is energized, the bimetallic strip 154s warps to such position that the contact members individual thereto are closed. Meanwhile, contact members 141x, 142x, and 143x have been opened. The transfer of the circuit to any one of the transformers 41, 42, and 43 to the spare transformer 44 is then effected on deenergization of any one of the three transformers.

In order to maintain contact members 154x closed for a time sufficient to effect the desired control function after the deenergization of transformer 151 and the closing of contact members 141x, the relay 154 is so chosen that it operates slower than does relay 141. Thus, contact members 154x remain closed for a time after the resistor 154r is deenergized.

In Figure 8 of the drawings I have shown a system that is similar to that shown in Figure 7 but in which magnetic relays 161, 162, and 163 are employed in place of the bimetallic thermal relays 141, 142, and 143. The relay 161 is provided with a winding 161w, and contact members 161x, 161y, and 161z. The contact members 161x are open when the winding 161w is energized while contact members 161y and 161z are closed. The relays 162 and 163 are similarly provided with operating windings and contact members that are arranged to operate as described for relay 161.

Although the relays 161, 162, and 163 may be fast enough to pick up on energization of the circuit before a false operation is caused, switches 164 and 165 may be provided for insuring that such false operation will not take place.

As shown in the drawings, the fuses 137, 138, and 139 are provided between the fuse switches 48 and the primary windings of the transformers 41, 42, and 43 rather than between the fuse switches 48 and the conductors A, B, and C of the supply circuit as is the case in Figure 8.

In describing the functioning of the system shown in Figure 8, it will be assumed that the transformers 41, 42, and 43 are normally supplying current to the load circuit from the supply circuit. Under these conditions the transformers 151, 152, and 153 are energized and the windings of the control relays 161, 162, and 163 are also energized. They will then be in the positions shown in the drawings.

In the event that a fault occurs in the transformer 41 sufficient to cause the blowing of one or both of the fuses 137, the secondary winding 41s becomes deenergized as does the transformer 151. The winding 161w of the control relay 161 is then deenergized and its contact members 161x close and contact members 161y and 161z open. Circuits are then completed for blowing the fuse links 48f and 49f individual to the transformer 41 for disconnecting it from the circuit and subsequently interconnecting the spare transformer 44 therebetween in its place.

The circuit for blowing the fuse links 48f may be traced from the transformer 152 through contact members 161x, conductors 166 and 167, fuse links 48f, conductor 168, switch 164, and conductor 169 to the transformer 152. The circuit for blowing the fuse link 49 may be traced from the transformer 152 through the closed contact members 161x, conductors 166 and 167, fuse link 49f, conductor 170, switch 165, and conductor 169 to the transformer 152.

It will be observed that the energy for blowing the fuse links individual to the fuse switches of any one of the transformers 41, 42, or 43 is obtained from the next transformer 152, 153, or 151, as the case may be, in order to insure that energy will be available for effecting the desired control function. Since contact members 161z remain open and transformer 151 remains deenergized as long as the transformer 41 remains deenergized, there is no possibility that either relay 162 or 163 will be capable of effecting a substitution of the spare transformer 44 for either of the transformers 42 or 43.

In Figure 9 of the drawings I have shown a system in which the transformers 41, 42, and 43 are connected star to the supply circuit and delta to the load circuit. In response to the occurrence of a fault in one of the transformers resulting in its deenergization, the spare transformer 41 is substituted therefor.

As shown, the transformers 41, 42, and 43 are connected to the supply circuit through fuses 171, 172, and 173. Fuse switches 174, one being individual to each conductor A, B, and C, are provided for selectively connecting the spare transformer thereto.

Thermal relays 141, 142, and 143, energized by transformers 151, 152, and 153, may be employed for effecting the desired control functions. The auxiliary relay 154 is provided for preventing false operation of the system as previously described.

It will be assumed that the system is normally operating and that a fault occurs in the transformer 41. As the result of this fault, the fuse 171 blows and the transformer 41 is disconnected from the conductor A. The transformer 151 is deenergized and contact members 141x of control relay 141 close. Circuits are then completed for blowing the fuse links 174f and 49f individual to the transformer 41. As a result, the spare transformer 44 is interconnected between the supply and load circuits in place of the transformer 41.

The circuit for blowing the fuse link 174f may be traced from the transformer 152 through strip 141s, contact members 141x, contact members 154x, conductors 175 and 176, fuse link 174f, and conductors 177 and 178 to transformer 152.

The circuits for blowing the fuse links 49f may be traced from the transformer 152 through the strip 141s, contact members 141x and 154x, conductors 175 and 176, fuse links 49f, and conductors 177 and 178 to the transformer 152.

Since there is the possibility of a feed back into the transformer 41 from the transformers 42 and 43 because of the delta connections, it may be desirable to provide fuses 181, 182, and 183, as illustrated, between the secondary windings and the load circuit so that such operation will be prevented.

It will be obvious that many other transformer connections may be employed and combinations of switch devices controlled by fuse links may be made without departing from the spirit and scope of this invention. Accordingly, it is intended that all matter contained in the foregoing description or shown in the accompanying drawings shall be interpreted as illustrative and not in a limiting sense.

I claim as my invention:

1. Apparatus for interconnecting an alternating current supply circuit and a load circuit comprising, in combination, preferred transformer means normally interconnecting said circuits, spare transformer means, means for repeatedly disconnecting said preferred transformer means from and reconnecting the same to said supply circuit on the occurrence of a fault, and means automatically operable after the last disconnection of said preferred transformer means from said supply circuit for interconnecting said spare transformer means between said circuits.

2. Apparatus for interconnecting an alternating current supply circuit and a load circuit comprising, in combination, preferred transformer means normally interconnecting said circuits, spare transformer means, means for repeatedly disconnecting said preferred transformer means from and reconnecting the same to said supply circuit on the occurrence of a fault, means automatically operable after the last disconnection of said preferred transformer means from said supply circuit for disconnecting the same from said load circuit, and means also automatically operable after said last disconnection for interconnecting said spare transformer between said circuits.

3. Apparatus for interconnecting an alternating current supply circuit and a load circuit comprising, in combination, preferred transformer means normally interconnecting said circuits, spare transformer means, means for repeatedly disconnecting said preferred transformer means from and reconnecting the same to said supply circuit on the occurrence of a fault, means automatically operable after the last disconnection of said preferred transformer means from said supply circuit for connecting said spare transformer means thereto, and means also automatically operable after said last disconnection for first disconnecting said preferred transformer means from said load circuit and subsequently connecting said spare transformer to said load circuit.

4. Apparatus for interconnecting an alternating current supply circuit and a load circuit comprising, in combination, preferred transformer means normally interconnecting said circuits, spare transformer means, fusible means interposed between said supply circuit and said preferred transformer means and disposed to disconnect the same on the occurence of a fault, and switch means controlled by said fusible means for effecting interconnection of said spare transformer means between said circuits on blowing of said fusible means.

5. Apparatus for interconnecting an alternating current supply circuit and a load circuit comprising, in combination, preferred transformer means normally interconnecting said circuits, spare transformer means, fusible means interposed between said supply circuit and said preferred transformer means and disposed to disconnect the same on the occurrence of a fault, switch means controlled by said fusible means for connecting said spare transformer to said supply circuit on blowing of said fusible means, and additional switch means for connecting said spare transformer to said load circuit.

6. Apparatus for interconnecting an alternating current supply circuit and a load circuit comprising, in combination, preferred transformer means normally interconnecting said circuits, spare transformer means, fusible means interposed between said supply circuit and said preferred transformer means and disposed to disconnect the same on the occurrence of a fault, switch means controlled by said fusible means for connecting said spare transformer to said supply circuit on blowing of said fusible means, and additional switch means for disconnecting said preferred transformer from said load circuit and for connecting said spare transformer thereto.

7. Apparatus for interconnecting an alternating current supply circuit and a load circuit comprising, in combination, a preferred transformer, a spare transformer, circuit means including fusible means normally connecting said preferred transformer to said supply circuit, circuit means including switch means normally connecting said preferred transformer to said load circuit, circuit means including switch means disposed to be closed on blowing of said fusible means for connecting said spare transformer to said supply circuit, circuit means including switch means for connecting said spare transformer to said load circuit, and means operable after blowing of said fusible means to open the first-named switch means and close the second-named switch means.

8. Apparatus for interconnecting an alternating current supply circuit and a load circuit comprising, in combination, a preferred transformer, a spare transformer, circuit means including fusible means normally connecting said preferred transformer to said supply circuit, circuit means including switch means normally connecting said preferred transformer to said load circuit, circuit means including switch means disposed to be closed on blowing of said fusible means for connecting said spare transformer to said supply circuit, circuit means including switch means for connecting said spare transformer to said load circuit, and additional fusible means disposed to be blown after blowing of the first-mentioned fusible means and arranged and adapted to effect the opening of the first-named switch means and the closing of the last-named switch means.

9. Apparatus for interconnecting an alternating current supply circuit and a load circuit comprising, in combination, a preferred transformer, a spare transformer, circuit means including repeating fusible means for repeatedly disconnecting said preferred transformer from and reconnecting the same to said supply circuit on the occurrence of a fault, circuit means including switch means normally connecting said preferred transformer to said load circuit, circuit means including switch means disposed to be closed after the last disconnection of said preferred transformer means from said supply circuit for connecting said spare transformer thereto, circuit means including switch means for connecting said spare transformer to said load circuit, and means operable after said last disconnection to open the first-named switch means and close the second-named switch means.

10. Apparatus for interconnecting an alternating current supply circuit and a load circuit comprising, in combination, a preferred transformer, a spare transformer, circuit means including repeating fusible means for repeatedly disconnecting said preferred transformer from and reconnecting the same to said supply circuit on the occurrence of a fault, circuit means including switch means normally connecting said preferred transformer to said load circuit, circuit means including switch means disposed to be closed after the last disconnection of said preferred transformer means from said supply circuit for connecting said spare transformer thereto, circuit means including switch means for connecting said spare transformer to said load circuit, and additional fusible means disposed to be blown after said last disconnection and arranged and adapted to effect the opening of the first-named switch means and the closing of the last-named switch means.

11. Apparatus for interconnecting an alternating current supply circuit and a load circuit comprising, in combination, a preferred transformer, a spare transformer, circuit means including fusible means normally connecting said preferred transformer to said supply circuit, circuit means including switch means normally connecting said preferred transformer to said load circuit, circuit means including switch means disposed to be closed on blowing of said fusible means for connecting said spare transformer to said supply circuit, circuit means including switch means for connecting said spare transformer to said load circuit, and means responsive to the energization of said spare transformer for opening the first-named switch means and closing the last-named switch means.

12. Apparatus for interconnecting an alternating current supply circuit and a load circuit comprising, in combination, a preferred transformer, a spare transformer, circuit means including repeating fusible means for repeatedly disconnecting said preferred transformer from and reconnecting the same to said supply circuit on the occurrence of a fault, circuit means including switch means normally connecting said preferred transformer to said load circuit, circuit means including switch means disposed to be closed after the last disconnection of said preferred transformer means from said supply circuit for connecting said spare transformer thereto, circuit means including switch means for connecting said spare transformer to said load circuit, and means responsive to the energization of said spare transformer as a result of said last disconnection for opening the first-named switch means and closing the last-named switch means.

13. Apparatus for interconnecting a single phase alternating current supply circuit and a single phase load circuit comprising, in combination, a preferred transformer normally interconnecting said circuits, means for repeatedly disconnecting said preferred transformer from and reconnecting the same to said single phase supply circuit on the occurrence of a fault, a spare transformer, and means automatically operable after the last disconnection of said preferred transformer for interconnecting said spare transformer between said circuits.

14. Apparatus for interconnecting a single phase alternating current supply circuit and a single phase load circuit comprising, in combination, a preferred transformer normally interconnecting said circuits, a spare transformer, means for repeatedly disconnecting said preferred transformer from and reconnecting the same to said supply circuit on the occurrence of a fault, and means automatically operable after the last disconnection of said preferred transformer from said supply circuit for disconnecting the same from said load circuit and for interconnecting said spare transformer between said circuits.

15. Apparatus for interconnecting an alternating current supply circuit and a load circuit comprising, in combination, a preferred transformer having primary and secondary windings, a spare transformer having primary and secondary windings, circuit means connecting one terminal of each primary winding to one conductor of said supply circuit, circuit means connecting one terminal of each secondary winding to one conductor of said load circuit, fusible means normally connecting the other terminal of the primary winding of said preferred transformer to another conductor of said supply circuit, switch means normally connecting the other terminal of the secondary winding of said preferred transformer to another conductor of said load circuit, switch means disposed to be closed on blowing of said fusible means for connecting the other terminal of the primary winding of said spare transformer to said other conductor of said supply circuit, switch means for connecting the other terminal of the secondary winding of said spare transformer to said other conductor of said load circuit, and means for operating the first and last-named switch means on energization of the secondary winding of said spare transformer to open the former and close the latter switch means.

16. Apparatus for interconnecting an alternating current supply circuit and a load circuit comprising, in combination, a preferred transformer having primary and secondary windings, a spare transformer having primary and secondary windings, circuit means connecting one terminal of each primary winding to one conductor of said supply circuit, circuit means connecting one terminal of each secondary winding to one conductor of said load circuit, fusible means normally connecting the other terminal of the primary winding of said preferred transformer to another conductor of said supply circuit, switch means normally connecting the other terminal of the secondary winding of said preferred transformer to another conductor of said load circuit, switch means disposed to be closed on blowing of said fusible means for connecting the other terminal of the primary winding of said spare transformer to said other conductor of said supply circuit, switch means for connecting the other terminal of the secondary winding of said spare transformer to said other conductor of said load circuit, and additional fusible means disposed to be blown after blowing of the first-mentioned fusible means and arranged and adapted to effect the opening of the first-mentioned switch means and the closing of the last-named switch means.

17. Apparatus for interconnecting a polyphase alternating current supply circuit and a polyphase load circuit comprising, in combination, a transformer individual to each phase, a spare transformer, and means for automatically interconnecting said spare transformer between said circuits in place of any one of said transformers on the occurrence of a fault therein.

18. Apparatus for interconnecting a polyphase alternating current supply circuit and a polyphase load circuit comprising, in combination, a transformer individual to each phase, a spare transformer, means responsive to the occurrence of a fault in any one of said transformers for disconnecting the same from said circuits, and means for automatically connecting said spare transformer between said circuits in place of the transformer in which the fault occurred.

19. Apparatus for interconnecting a polyphase alternating current supply circuit and a polyphase load circuit comprising, in combination, a transformer individual to each phase, a spare transformer, means responsive to the occurrence of a fault in any one of said transformers for disconnecting the same from said circuits, means for automatically connecting said spare transformer between said circuits in place of the transformer in which the fault occurred, and means for preventing further change in the connections of said spare transformer once it has been substituted for one of said transformers.

20. Apparatus for interconnecting a polyphase alternating current supply circuit and a polyphase load circuit comprising, in combination, a transformer individual to each phase, a spare transformer, fusible means individual to each transformer for normally connecting the same to said load circuit, and switch means controlled by said fusible means for interconnecting said spare transformer between said circuits in place of any one of said transformers on blowing of the fusible means individual thereto.

21. Apparatus for interconnecting a polyphase alternating current supply circuit and a polyphase load circuit comprising, in combination, a transformer individual to each phase, a spare transformer, fusible means individual to each transformer for normally connecting the same to said load circuit, switch means controlled by said fusible means for connecting said spare transformer to said supply circuit in place of any one of said transformers on blowing of the fusible means individual thereto, and switch means also controlled by said fusible means for disconnecting any one of said transformers from said load circuit on blowing of the fusible means individual thereto and for connecting said spare transformer to said load circuit in place of the disconnected transformer.

22. Apparatus for interconnecting a polyphase alternating current supply circuit and a polyphase load circuit comprising, in combination, a transformer individual to each phase, a spare transformer, fusible means individual to each transformer for normally connecting the same to said load circuit, switch means controlled by said fusible means for connecting said spare transformer to said supply circuit in place of any one of said transformers on blowing of the fusible means individual thereto, switch means also controlled by said fusible means for disconnecting any one of said transformers from said load circuit on blowing of the fusible means individual thereto and for connecting said spare transformer to said load circuit in place of the disconnected transformer, and means for preventing further change in the connections of said spare transformer once it has been substituted for one of said transformers.

23. Apparatus for interconnecting a polyphase alternating current supply circuit and a polyphase load circuit comprising, in combination, a transformer individual to each phase, a spare transformer, repeating fusible means individual to each of said transformers for repeatedly disconnecting and reconnecting the same from and to said supply circuit on the occurrence of a fault, and switch means operable after the last disconnection of any one of said transformers from said supply circuit for interconnecting said spare transformer in place of said one transformer between said circuits.

24. Apparatus for interconnecting a polyphase alternating current supply circuit and a polyphase load circuit comprising, in combination, a transformer individual to each phase, a spare transformer, fusible means individual to each transformer for normally connecting the same to said load circuit, switch means individual to each phase and common to said spare transformer for interconnecting the same between said circuits in place of any one of said transformers, and relay means individual to each phase and controlled by said fusible means individual thereto for operating the corresponding switch means.

25. Apparatus for interconnecting a polyphase alternating current supply circuit and a polyphase load circuit comprising, in combination, a transformer individual to each phase, a spare transformer, fusible means individual to each transformer for normally connecting the same to said load circuit, switch means individual to each phase and common to said spare transformer for interconnecting the same between said circuits in place of any one of said transformers, relay means individual to each phase and controlled by said fusible means individual thereto for operating the corresponding switch means, and means for interlocking said relay means in such manner that a second relay means cannot be operated once one relay means has been operated.

26. Apparatus for interconnecting a three phase alternating current supply circuit and a three phase load circuit comprising, in combination; a transformer individual to each phase, the primary windings of said transformer being delta connected to said supply circuit and the secondary windings being star connected to said load circuit; fusible means interposed between each primary winding and said supply circuit, a spare transformer, switch means individual to each phase and common to said spare transformer for interconnecting the same between said circuits in place of any one of said transformers, and relay means individual to each transformer and controlled by the fusible means individual thereto for operating the corresponding switch means.

27. Apparatus for interconnecting a three phase alternating current supply circuit and a three phase load circuit comprising, in combination; a transformer individual to each phase, the primary windings of said transformers being delta connected to said supply circuit and the secondary windings being star connected to said load circuit; fusible means interposed between each primary winding and said supply circuit; switch means individual to each primary and secondary winding for normally connecting the same to their respective circuits; a spare transformer, switch means individual to each primary and secondary winding and common to said spare transformer for interconnecting the same between said circuits in place of any one of said transformers, and relay means individual to each transformer and controlled by the fusible means individual thereto for operating both said switch means in such manner as to disconnect one transformer from said circuits and substitute said spare transformer therefor.

28. Apparatus for interconnecting a three phase alternating current supply circuit and a three phase load circuit comprising, in combination; a transformer individual to each phase, the primary windings of said transformers being delta connected to said supply circuit and the secondary windings being star connected to said load circuit; fusible means interposed between each primary winding and said supply circuit; switch means individual to each primary and secondary winding for normally connecting the same to their respective circuits, a spare transformer, switch means individual to each primary and secondary winding and common to said spare transformer for interconnecting the same between said circuits in place of any one of said transformers, relay means individual to each transformer and controlled by the fusible means individual thereto for operating both said switch means in such manner as to disconnect one transformer from said circuits and substitute said spare transformer therefor, and means for interlocking said relay means in such manner that the operation of a second relay means is prevented after operation of one relay means.

29. Apparatus for interconnecting a three phase alternating current supply circuit and a three phase load circuit comprising, in combination; a transformer individual to each phase, the primary windings of said transformers being star connected to said supply circuit and the secondary windings being delta connected to said load circuit; fusible means interposed between each primary winding and said supply circuit, a spare transformer, switch means individual to each phase and common to said spare transformer for interconnecting the same between said circuits in place of any one of said transformers, and relay means individual to each transformer and controlled by the fusible means individual thereto for operating the corresponding switch means.

30. Apparatus for interconnecting a three phase alternating current supply circuit and a three phase load circuit comprising, in combination; a transformer individual to each phase, the primary windings of said transformers being star connected to said supply circuit and the secondary windings being delta connected to said load circuit; fusible means interposed between each primary winding and said supply circuit, a spare transformer, switch means individual to each phase and common to said spare transformer for interconnecting the same between said circuits in place of any one of said transformers, fusible means individual to each switch means for controlling the functioning thereof, means for obtaining a voltage from said secondary windings of said transformers regardless of the deenergization of one of them, and relay means individual to each transformer and controlled by the fusible means individual thereto for selectively applying said voltage to the fusible means of the corresponding switch means.

31. Apparatus for interconnecting a preferred supply circuit and an auxiliary supply circuit to a load circuit comprising, in combination, circuit means normally interconnecting said preferred supply circuit and said load circuit, means for repeatedly disconnecting said preferred supply circuit from and reconnecting the same to said load circuit on the occurrence of a fault, and means automatically operable after the last disconnection for interconnecting said auxiliary supply circuit and said load circuit.

EARL L. TORNQUIST.